(12) United States Patent
Harada et al.

(10) Patent No.: US 7,636,777 B1
(45) Date of Patent: *Dec. 22, 2009

(54) RESTRICTING ACCESS TO REQUESTED RESOURCES

(75) Inventors: Larry T. Harada, Mountain View, CA (US); Alexandrea Asher, San Francisco, CA (US); Raksas Hang, Mountain View, CA (US)

(73) Assignee: AOL LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/674,444

(22) Filed: Feb. 13, 2007

Related U.S. Application Data (63) Continuation of application No. 10/158,199, filed on May 31, 2002, now Pat. No. 7,181,513.

(60) Provisional application No. 60/360,019, filed on Feb. 28, 2002.

(51) Int. Cl.
G06F 15/173 (2006.01)

(52) U.S. Cl. ............ 709/223; 709/224; 709/225; 705/67; 705/75

(58) Field of Classification Search .......... 709/223, 709/224; 705/67, 75
See application file for complete search history.

(56) References Cited

U.S. PATENT DOCUMENTS

| | | | |
|---|---|---|---|
| 5,911,043 A | 6/1999 | Duffy et al. | |
| 6,266,664 B1 | 7/2001 | Russell-Falla et al. | |
| 6,272,641 B1 | 8/2001 | Ji | |
| 6,425,011 B1 | 7/2002 | Otani et al. | |
| 6,493,744 B1 * | 12/2002 | Emens et al. | 709/203 |
| 6,510,458 B1 * | 1/2003 | Berstis et al. | 709/219 |
| 6,542,925 B2 * | 4/2003 | Brown et al. | 709/208 |
| 6,662,365 B1 | 12/2003 | Sullivan et al. | |
| 6,745,367 B1 | 6/2004 | Bates et al. | |

(Continued)

FOREIGN PATENT DOCUMENTS

WO    WO 00/08573    2/2000

OTHER PUBLICATIONS

Press Release, www.rulespace.com/press/releases/05022001.html as of May 15, 2001 according to www.archive.org.

(Continued)

Primary Examiner—Saleh Najjar
Assistant Examiner—Tina T Nguyen
(74) Attorney, Agent, or Firm—Fish & Richardson P.C.

(57) ABSTRACT

Access to network information may be restricted based on a classification of the network information. When a request for network information is received, a classification of the network information is determined. The network information may be classified as static or dynamic. If the network information is classified as static, a rating of the content that corresponds to the network information is determined. If the network information is dynamic, the network information is accesses, and a rating of the content associated with the network information is generated. After determining a content rating, the content rating is compared to a user content setting of user making the request for the network information. Based on the comparison, it is determined if access to network information is approved. If approved, the content is retrieved and/or access is granted, otherwise, the access to the network information is restricted or blocked.

27 Claims, 7 Drawing Sheets

U.S. PATENT DOCUMENTS

| | | | |
|---|---|---|---|
| 6,772,214 B1 * | 8/2004 | McClain et al. | 709/229 |
| 7,089,246 B1 | 8/2006 | O'Laughlen | |
| 7,171,443 B2 * | 1/2007 | Tiemann et al. | 709/203 |
| 7,181,513 B1 | 2/2007 | Harada et al. | |
| 7,187,658 B2 * | 3/2007 | Koyanagi et al. | 370/254 |
| 2002/0120754 A1 | 8/2002 | Anderson et al. | |
| 2003/0105863 A1 * | 6/2003 | Hegli et al. | 709/225 |
| 2003/0191971 A1 * | 10/2003 | Klensin et al. | 713/201 |
| 2004/0019650 A1 * | 1/2004 | Auvenshine | 709/206 |

OTHER PUBLICATIONS

Rulespace, Inc. website, www.rulespace.com, as of Mar. 9, 2000 according to www.archive.org.

Rulespace, Inc. website, www.rulespace.com, as of Apr. 19, 2001 according to www.archive.org.

Chu et al., "Defaults and Overrides," http://www.w3.org/PICS/defaults.html, dated Mar. 1997.

Miller, Jim et al., "Rating Services and Rating Systems (and Their Machine Readable Descriptions)," http://www.w3.org/TR/REC-PICS-services, pp. 1-10, dated Oct. 31, 1996.

Krauskopf, Tim et al., "PICS Label Distribution Label Syntax and Communication Protocols," http:www.w3.org/TR/REC-PICS-lables, pp. 1-13, dated Oct. 31, 1996.

U.S. Appl. No. 10/158,199 (now U.S. Patent No. 7,181,513, see AD above).

U.S. Office Action issued in U.S. Appl. No. 11/462,948 dated Dec. 14, 2007.

U.S. Office Action issued in U.S. Appl. No. 11/462,948 dated Jul. 3, 2007.

* cited by examiner

FIG. 1

| | 210 | 221 | 222 | 223 | 224 | 225 | 226 | 227 | 228 |
|---|---|---|---|---|---|---|---|---|---|
| www. pornographicsite.net/? 202 | 0 | 1 | 0 | 0 | 0 | 1 | 0 | 1 | 0 |
| www. cartoonsite.com/? 203 | 0 | 0 | 0 | 0 | 0 | 0 | 0 | 0 | 0 |
| www.companyx.biz/clothes/? 204 | 0 | 0 | 0 | 0 | 0 | 0 | 0 | 1 | 0 |
| www.companyx.biz/hunting/? 205 | 0 | 0 | 0 | 0 | 0 | 0 | 0 | 1 | 1 |
| www.fictionalmag.net/? 206 | 1 | | | | | | | | |

```
<HTML>

<HEAD>

<TITLE> FICTIONAL MAG--MEN'S WEEKLY—For the Modern Man! </TITLE>

</HEAD>

<BODY BACKGROUND=MEN'S WEEKLY Main Page.gif>

<P>

<BLOCK QUOTE>

<IMG SRC = "predomartinez.gif" ALIGN=LEFT>

<BLOCK QUOTE>

<EVEN WITH PEDRO WILL THE RED SOX EVER WIN ANOTHER WORLD SERIES?>

<P>

<HREF = "redsox.html"><Yes, but not in Fenway!>

<BLOCK QUOTE>

<BLOCK QUOTE>

<MENWEEKLY'S WEEKLY GIRL>

<P>

<IMG SRC = "janedoe.gif">

<BLOCK QUOTE>

<HREF= "janedoe.html"><Nude Photo Shoot with Playmate Jane Doe>

<BODY>

</HTML>
```

RESTRICTING ACCESS TO REQUESTED RESOURCES

This application is a continuation of U.S. Utility application Ser. No. 10/158,199 filed May 31, 2002, and titled "Restricting Access to Requested Resources," which claims priority from U.S. Provisional Application No. 60/360,019 filed Feb. 28, 2002, and titled "Restriction Access to Requested Resources," both of which are incorporated by reference.

TECHNICAL FIELD

The following description relates to restricting access to requested resources, and more particularly to restricting access to network information.

BACKGROUND

A vast collection of information created by different individuals, groups, institutions, companies, and others throughout the world is made available to the public through global networks, such as the Internet. Access to public information on the Internet may be obtained using a computer having a connection to the Internet and a browser.

Because the Internet is a global network, it may be used to access information that is directed to many different topics. For example, information may be directed to religion, cultures, ideologies, and lifestyles, some of which may be considered offensive to certain individuals. In addition, Internet accessible information may be considered graphic, violent, harmful, illegal, or sexual, and, therefore, inappropriate for certain users. As such, various mechanisms have been developed to regulate access to information available from the Internet.

SUMMARY

According to one general aspect, access to network information may be restricted based on a classification of the network information. When a request for network information is received, a classification of the network information is determined. The network information may be classified as static or dynamic.

If the network information is classified as static, a rating of the content that corresponds to the network information is accessed or determined. If the network information is classified as dynamic, the network information is accessed, and a rating of the content associated with the network information is generated.

The rating is compared to a user content setting of user making the request for the network information. Based on the comparison, access to network information is approved or restricted. If approved, the content is retrieved and/or access is granted; otherwise, the access to the network information is restricted or blocked.

DESCRIPTION OF DRAWINGS

Like reference symbols in the various drawings indicate like elements.

DETAILED DESCRIPTION

FIGS. 1A and 1B show a systems 100A and 100B that may be used to restrict access to information from a number of sources 105 connected to a network 110. The network information may include web pages, resources, and other digital content that may be used to present text, graphics, sound, animation, audio, or video elements, or any combination of these elements to a user. A web page may incorporate text, graphics, sound, animation, and other multimedia elements to present information associated with the web page to a user. Web pages also may be used to access resources and link to other information. Web pages may be built using a markup language, such as, for example, a Hypertext Markup Language (HTML), a standard generalized markup language (SGML), a dynamic HTML (DHTML), or an extensible markup language (XML). Resources may include attachments, files, instructions, applications, data, and software.

The network 110 may be implemented using a local area network (LAN), a wide area network (WAN), a global network, or a combination of these networks (e.g., the Internet and the World Wide Web). In the following examples, the World Wide Web is used to illustrate the operation of the system 100.

A client 120 may be operated by one or more users to access network information. The client 120 may be implemented using, for example, a server, a workstation, a computer, a processor, or any intelligent device that is capable of executing instructions and connecting to a network. The client 120 may include any number of devices and/or peripherals (not shown) (e.g., displays, memory/storage devices, input devices, interfaces, printers, communication/application cards, and speakers) that facilitate the access and use of network information.

The client 120 also may include a number of software applications, including an application that is configured to access, interpret, and present network information. The software application may be implemented using a browser 125, such as, for example, Netscape Communicator, Microsoft's Internet Explorer, or any other software application that may be used to interpret and process a markup language, such as, for example, HTML, SGML, DHTML, or XML.

The browser 125 may comprise software including plug-in applications that allow the browser 125 to interpret, process, and present different types of network information. The browser 125 also may incorporate application tools, such as, for example, Java, Active X, and JavaScript. In addition, a browser 125 may be implemented or embedded within another software application (e.g., an active desktop, a word processor, an email, a chat, or an organizer).

The browser 125 may be used to contact a source 105 (e.g., a web server) connected to the network 110 to request network information associated with the source 105. The source 105 locates the requested network information and sends the requested network information to the browser 125. The browser 125 interprets commands of the markup language to present the network information to a user.

The client 120 may be configured to connect to a host 130. The host 130 may provide a gateway or an access point for the client 120 to connect to the network 110 by routing requests for network information from the client 120 to the network 110. The host 130 also may direct responses from the network 110 to the client 120. The host 130 may be part of a private network (e.g., a LAN or a WAN) that includes the client 120, or the host 130 may be part of a private network that is external to and therefore contacted by the client 120 (e.g., using a dial-up connection). According to one implementation, the host 130 may be implemented by an Internet service provider (ISP).

The client 120 and host 130 may be connected using a communications link 131. The communications link 131 may be configured to send and receive signals (e.g., electrical, electromagnetic, or optical) that convey or carry data streams representing various types of digital content (e.g., data, information, and resources). For example, the communications link 131 may be implemented using a plain old telephone service (POTS) line network, a digital subscriber line (DSL) network, an integrated services digital network (ISDN), and a synchronous optical network (SONET). In addition, a communications link 131 may include a wireless link using electromagnetic signals, such as, for example, radio, infrared, and microwave signals, to convey information. The communications link may include ?????????.

As shown in FIG. 4, the host 130A may include a collection of devices, such as, for example, a source 105, a proxy server 132, a rating-application technology server (RATS) 134 and a content over?? 140. The proxy server 132 handles requests from the client 120 to access network information, which may be resident on or accessible through sources 105 within the host 130 or connected to the network 110. The RATS 134 helps determine whether to grant access to the requested network information at the source 105. The proxy server 132 and the RATS 134 may be implemented by a single intelligent device, or they may be distributed among a number of intelligent devices (e.g., processors, computers, and servers). In addition, the RATS 134 may be located apart from the host 130 and may be accessed by more than one proxy server 132.

When a user wishes to access network information, the client 120 establishes a connection to the host 130 using a communications link 131. The connection may be permanent or temporary. The client 120 and the host 130 may establish a connection using a login procedure. During the login procedure, the client 120 and host 130 may establish a connection and a communications protocol. In addition, the host 130 may require some form of identification (ID), for example, a password or other ID that is associated with the user of the client 120. The ID may be used to access a user profile stored by the host 130.

The proxy server 132 may assign client identification (ID) or ticket to the client 120. The client ID may be used to enable communications between the client 120 and the network (and its associated sources 105). For example, the client ID may be used by the proxy server 132 to handle requests for network information (e.g., to send the network information to the browser for display). In one implementation, the client ID may be a network address, for example, an Internet protocol (IP) address that is used as the source address to which replies for requested network information are sent. The client 120 then may request network information from a source 105.

Client generated requests to access network information may include an address that indicates the location of the network information, such as, for example, a uniform resource locator (URL). The browser 125 sends the URL to the host 130 using a protocol, such as, for example, a hypertext transfer protocol (HTTP). The host 130 may obtain an IP destination address corresponding to the URL to access the information from a source. For example, the client 120 may send a request to the host 130 for a "web-page" from "company x" using a URL that corresponds to the web page, such as "http://www.companyx.com/dir/page.html." The first part of the URL (i.e., http://) indicates the communications protocol used. The second part (i.e., "www.companyx.com/") may be a domain used to indicate what kind of source is being contacted. The third part (i.e., "dir/") may be used to identify the site or source 105 (e.g., a web server) that is to be contacted. The final part (i.e., "page.html") may be used to indicate a directory, a file, a page, or an other resource associated of the source 105. Within the host 130, the proxy server 132 translates the URL "http://www.companyx.com/dir/page.html" to an IP destination address, such as, for example "111.11.111.1." The proxy server 132 then accesses the source 105 specified by the IP destination address.

Search engines and other tools make locating network information relatively easy once a client is connected to the network 110. Thus, in many instances, sources 105 (and their associated network information) may be accessed based on merely providing a URL to a browser 125 loaded on an intelligent device connected to the network 110. Therefore, in certain instances, it may be desirable to limit or restrict access to the network information that may be requested by the browser 125 and the client 120. For example, a parent may wish to restrict the information that is accessible by children, or a user may wish to restrict access to information that he or she may find offensive.

Access to network information may be blocked or restricted by rating the network information according to categories of content and user content settings related thereto. Specifically, a number of categories may be used to rate the content of network information, such as, for example, alcohol, educational, nature, drugs, abortion, cults, gambling, guns, hate, weapons, news, sex advice, sex education, shopping, sports, tobacco, travel, pornography, lifestyle, violence, gambling, current events, cultural, religious, and mature content. These categories are exemplary; they are not intended to be limiting.

User access information may be established to restrict access to network information that includes content in one or more of the selected categories assigned to the user access information. For example, predefined user access information may be established to regulate content made available to predefined groups of individuals, such as, for example, kids, young teens, mature teens, and adults. In one such implementation, user access information for kids may be configured to exclude network information related to alcohol, drugs, abortion, cults, gambling, hate, weapons, news, sex advice, sex education, shopping, tobacco, travel, pornography, lifestyle, violence, gambling, current events, cultural, religion, and mature content. User access information for young teens may exclude alcohol, drugs, abortion, cults, hate, weapons, sex advice, sex education, tobacco, pornography, lifestyle, violence, gambling, cultural, and mature content. User access information for mature teens may be configured to exclude network information relating to alcohol, drugs, hate, weapons, pornography, violence, gambling, and mature content. User access information for adults may be configured to allow access to any category of network information. Furthermore, different or user-customized user access information may be established to regulate access by one or more individuals to selected categories. For example, a user could create user access information that excludes network information relating to pornography, occult, sex advice, and mature content.

The user content settings may be stored in, or associated with, the user profile. The user access information may be stored in the client 120, the host 130, or some other device. When the client 120 establishes a connection with the host 130 during the login procedure, the proxy server 132 may access the corresponding user profile to determine an appropriate user access information. The proxy server 132 in conjunction with the RATS 134 may use the user access information to approve, block, or restrict access to network information, as explained in further detail below.

The RATS 134 may include an application programming interface (API) 136 and a number of resource classifiers 138, 139, for example, lists, files, databases, lookup tables, or other structures for storing and/or organizing data. The API 136 may access the resource classifiers to retrieve data that may be used to determine whether or not to restrict access to requested network information. In addition, the RATS 134 may include a content override 140 that may be used to override a resource classifier. The content override 140 may include a number of URLs that have an associated classification (e.g., static or dynamic) and a content rating (e.g., a content map) that is used by the RATS 134 to determine whether to grant access, block, or restrict requested network information. The content override 140 is described in further detail below.

Network information and its corresponding URL may be classified as static or dynamic. A classification of static may designate that the network information associated with an address has been determined to be related to specific categories of information. A dynamic classification may designate that the network information associated with an address has information that may or may not include information relating to certain categories of content. In one example, information classified as dynamic may change regularly and not be predisposed to any particular content category. For example, a URL may not regularly include information that relates to abortion; however, on occasion, such information may be accessible. Rather than classify the URL on the remote possibility that it may contain particular content, or that the URL on occasion has contained particular content, a dynamic classification allows for a determination to be made at the time of the request for the information.

In the implementation of FIG. 1A, the RATS 134 includes a static resource classifier 138 and a dynamic resource classifier 139. The static resource classifier 138 may store a number of network addresses (e.g., URL and IP) for sources 105 and their associated network information. For example, the static resource classifier 138 may store an entire or partial URL (collectively referred to as a "URL" below) that is associated with network information. One or more indications that may be used to determine the type of content or information corresponding to the address are associated with network addresses within the static resource classifier 138, thus enabling regulation of access to the network information with respect to the addresses. For example, a content rating may be stored for a URL that is used to determine whether to block, restrict, or grant access to network information associated with that URL.

As shown in FIG. 1B, the system 100B may include a RATS for each resource classifier. For example, the host 130 may include a static RATS 135 and a dynamic RATS 137. The RATS 135 and 137 may each include an API 136. The static RATS 135 may include a static resource classifier 138 and a content override 140. The dynamic RATS 137 may include a dynamic resource classifier 139.

The proxy server 132 provides a URL and user access information to the static RATS 135. The static RATS 135 may determine if the URL is static or dynamic as described below. If the URL is static, then the static RATS 135 approves, blocks, or restricts access. If the static RATS 135 determines that the rating is dynamic, an indication that the URL is dynamic is returned to the proxy server 132. The proxy server 132 may determine to block access to the information based on the dynamic rating and the user access information as described above. In addition, the proxy server 132 may access the network information associated with the URL and provide network information and the user access information to the dynamic RATS 137. The dynamic RATS 137 may generate a content rating for the network information and determine if access to the information should be granted or restricted as described above. The RATS 137 returns a determination to the proxy server 132 to restrict, block, or access the information.

Figure 2:
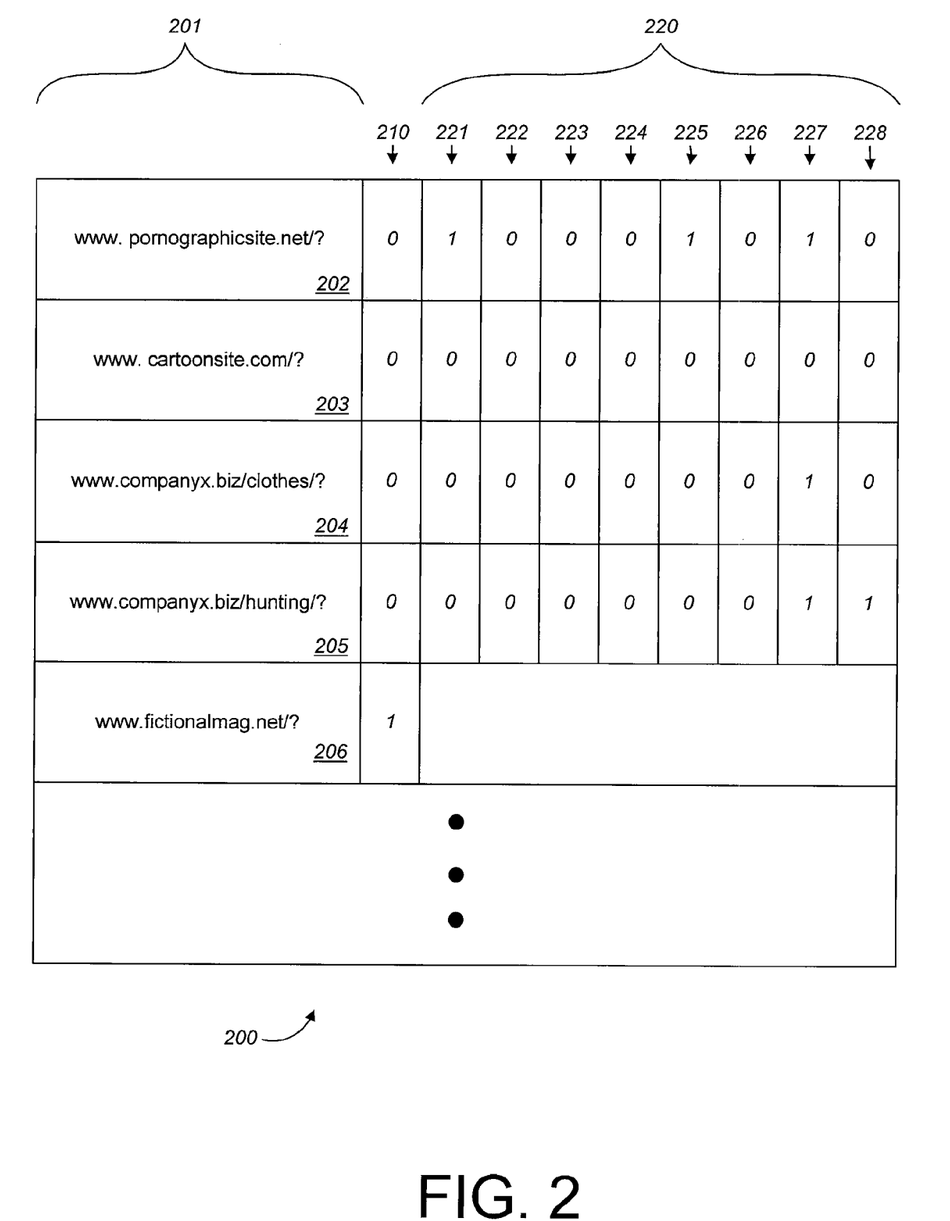
FIG. 2 is an exemplary portion of a resource classifier file that may be used by one implementation of the system of FIGS. 1A and 1B to restrict access to information.

As shown in FIG. 2, an example of a portion 200 of a static resource classifier 138 may include a number of addresses 201, such as, for example, "www.pornographicsite.net/?" 202, "www.cartoonsite.com/?" 203, "www.companyx.biz/clothes/?" 204, "www.companyx.biz/hunting/?" 205, and "www.fictionalmag.net/?" 206. An identifier 210 may be associated with each URL to indicate that an address is classified as static or dynamic. For example, if the identifier 210 is set to a logic zero, then the corresponding URL is classified as static. If the identifier 210 is set to a logic one, then the corresponding URL is classified as dynamic. Alternatively, the absence of a URL in the static resource classifier may be used to indicate that a URL is classified as dynamic. For example, if a search of the static resource classifier 138 does not find a URL, the RATS 134 returns a message, typically to the proxy server 132, that the URL is classified as dynamic. Similarly, a list of URLs that are classified as dynamic may be used. In this case, if a search of the resource classifier does not find a URL, the RATS 134 or 135 determines that the URL is static.

A content rating also may be associated with each URL that is classified as static. The content rating may include a number of content indicators for each category that is used to rate the URLs. For example, a content rating may include categories, such as, for example, alcohol 221, drugs 222, abortion 223, violence 224, pornography 225, hate 226, shopping 227, and weapons 228 that collectively form a content map 220.

As shown in FIG. 2, the URL 202 "www.pornographicsite.net" is classified as static and may contain information relating to alcohol, pornography, and shopping. The URL 240 "www.fictionalmag.net" is classified as dynamic, and, therefore, has no corresponding content map 220.

When the client 120 requests network information, the proxy server 132 determines the user access information associated with the user profile of the operator making the request (e.g., using an assigned network address, a client ID, or ticket). The proxy server 132 provides the RATS 134 or 135 with the URL and the user access information associated with the request for network information. The API 136 of the RATS 134 or 135 uses the URL to access the static resource classifier 138 to determine a classification for the URL (e.g., static or dynamic). If the URL is rated as static, the API 136 returns a content map 220 for the URL, and the RATS 134 or 135 processes the content map 220 based on the user access information to determine whether to restrict access to the network information. The RATS 134 or 135 provides the proxy server 132 with the determination whether or not to restrict access to the network information.

Figure 3A:
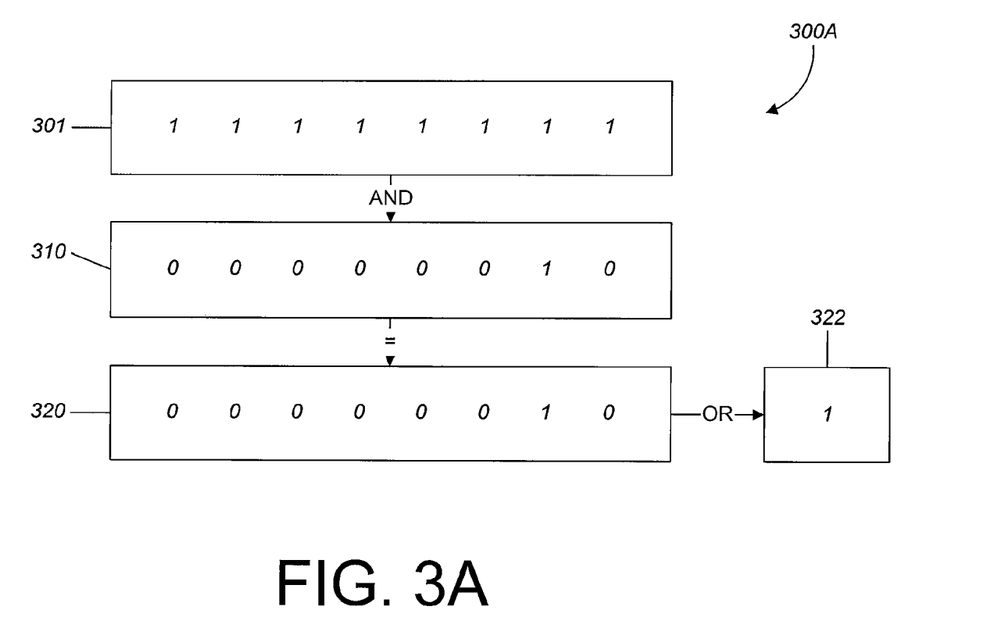
FIGS. 3A and 3B are examples of an application of user access information for the resource classifier file shown in FIG. 2.

FIG. 3A shows an example 300A of the use of the user access information and content map 220. In this example, a user access information for kids 301 creates a mask that corresponds to the content categories shown in FIG. 2. If the user access information 301 has a value of 1 stored for a corresponding category, then the RATS 134, determines to restrict access to network information including content in that category. For example, the user access information shown for kids 301 is compared to the content map 220 of requested network information to determine whether access to the information should be restricted.

More specifically, if a user requests the URL 204 (e.g., "www.companyx.biz/clothes"), the RATS 134 or 135 determines that the URL 204 is classified as static and determines a corresponding content map 310. The user access information 301 is compared to the content map 310 to determine if the network information associated with the URL 204 may be accessed. For example, the user content setting 301 and content map 310 may be logically "ANDed" to derive a comparison set 320.

The RATS 134 or 135 uses the comparison set 320 to determine an indicator 322 that designates whether the network information associated with the URL 204 may be accessed. For example, the values of the comparison set may be logically "ORed" to derive an indicator 322 having a logical one (e.g., based on the category shopping). An indicator 322 having a value of logic one may designate that access should be restricted, and a value of logic zero may indicate that access is permitted. In this case, the RATS instructs the proxy server 132 not to send the request to the source 105, and the proxy server 132 may return a browser error message to the client 120 (e.g., stating that access is denied).

Figure 3B:
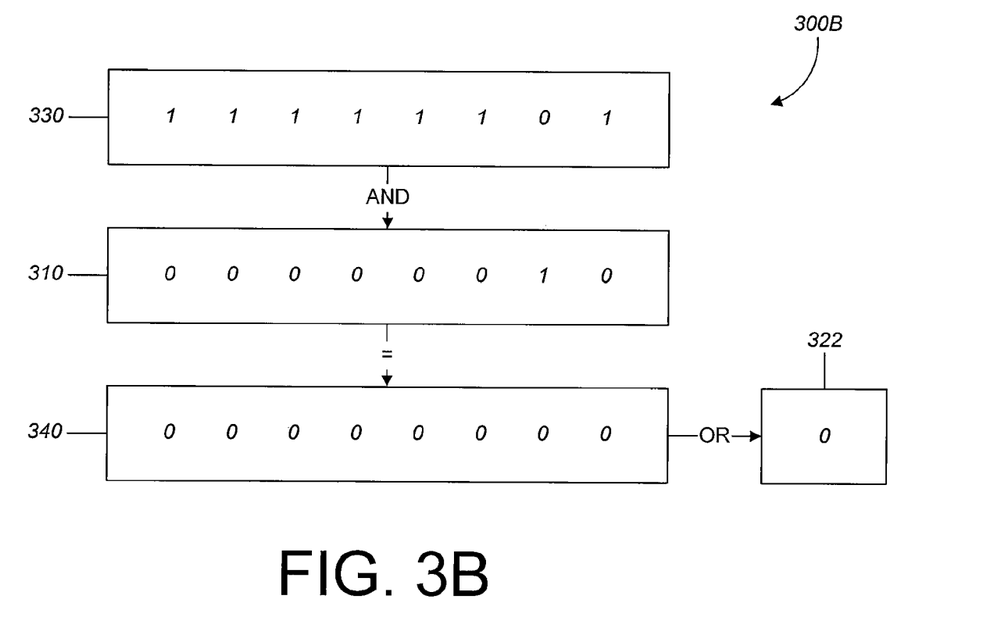

In contrast, FIG. 3B shows an example 300B of a request for the same information associated with URL 204 by a user with a different user access information. In this example, user access information for young teens 330 creates a mask that corresponds to the content categories shown in FIG. 2. A request for the same URL 204 retrieves the content map 310. A comparison of the user access information 330 and the content map 310 results in a comparison set 340, which contains all zeros. A logical OR of the comparison set 340 results in an indicator 322 of a logic zero (designating that the information may be accessed). The proxy server 132 then forwards the request to the source 105 specified by URL 204, and the source 105 returns a web page for clothing to the proxy server 132. The proxy server 132 identifies the IP address associated with the request, and forwards the clothing web page to the corresponding browser 125 for presentation to the user.

As described above, the RATS 134 and 137 also may include a dynamic resource classifier 139. The dynamic resource classifier 139 may be an application, system, dataset, or combination thereof that is used to rate the content of information associated with an address. For example, if the network information associated with a URL is classified as dynamic by the static classifier 138, the RATS 134 or 135 return an indication of dynamic for the URL to the proxy server 132.

In one implementation, based on receiving an indication from the RATS 134 or 135 that a URL is classified as dynamic, the proxy server 132 may determine to block or restrict access to the URL based on the user access information. For example, if the requestor has a user access information of kids only, the proxy server 132 may determine to block access to the requested network information.

In response to receiving an indication of a dynamic URL from the RATS 134 or 135 the proxy server 132 also may send a request for the network information associated with the URL to the source 105 corresponding to the network information. When source 105 replies to the proxy server 132 with the network information the proxy server 132 may provide the network information to the RATS 134 or 137, or the proxy server 132 may examine the network information returned from the source 105, for example, by extracting data associated with the network information, such as text data or metadata.

The accessed network information and/or the extracted data may be provided to the RATS 134 or 137. The RATS 134 or 137 accesses the dynamic resource classifier 139 using API 136 to generate a content rating for the network information based on the network information and/or the extracted data. For example, the dynamic resource classifier 139 and API 136 may generate a content map 220 for the extracted data using the same categories that are used to rate addresses in the static resource classifier 138. In one implementation, the API and information stored by the rating devices may be provided and/or implemented by a third party vendor. The dynamic resource classifier 139 may rate the network information as a whole, or the dynamic resource classifier 139 may act to rate one or more individual objects from within the extracted data that makes up the network information.

If the extracted data includes content in any category, then the corresponding category in the content map 220 is set to a logic one. All remaining categories are set to zero. In addition, if the dynamic resource classifier 139 is unable to rate the content for any extracted data with regard to the content categories, then the corresponding categories for the extracted data may be set to one.

The RATS 134 or 137 compares the generated content map 220 to the user access information associated with the user profile to determine whether to grant or restrict access to the network information. If the content map 220 indicates that any content of the information may not be accessed by the operator having the user access information, the RATS 134 or 137 provides the proxy server 132 an indication that the proxy server 132 should block access to the information; otherwise, the network information is provided to the browser 125 for presentation to the user.

The proxy server 132 may grant limited access to network information of multiple objects by blocking access to objects containing content that is restricted by the user access information, and granting access to other objects containing content that is not restricted. For example, when a web page is displayed, a portion of the web page that is accessible may be presented normally; however, a restricted area may remain blank or include an indicator showing the content is restricted.

In a more specific example, a browser 125 may request network information that corresponds to the web site "www-.fictonalmag.net/dir/frontpage.html." In response to the request, the proxy server 132 provides the URL and user access information to the RATS 134 or 135. The RATS 134 or 135 accesses the static resource classifier 138 and determines that the network information corresponding to URL 206 is classified as dynamic. The RATS 134 or 135 instructs the proxy server 132 that the URL is dynamically rated. The proxy server 132 then requests the network information associated with the URL 206 from the corresponding source 105 on the network 110. In response, network information is provided to the RATS 134 or 137 for generation of a content rating.

Figure 4:
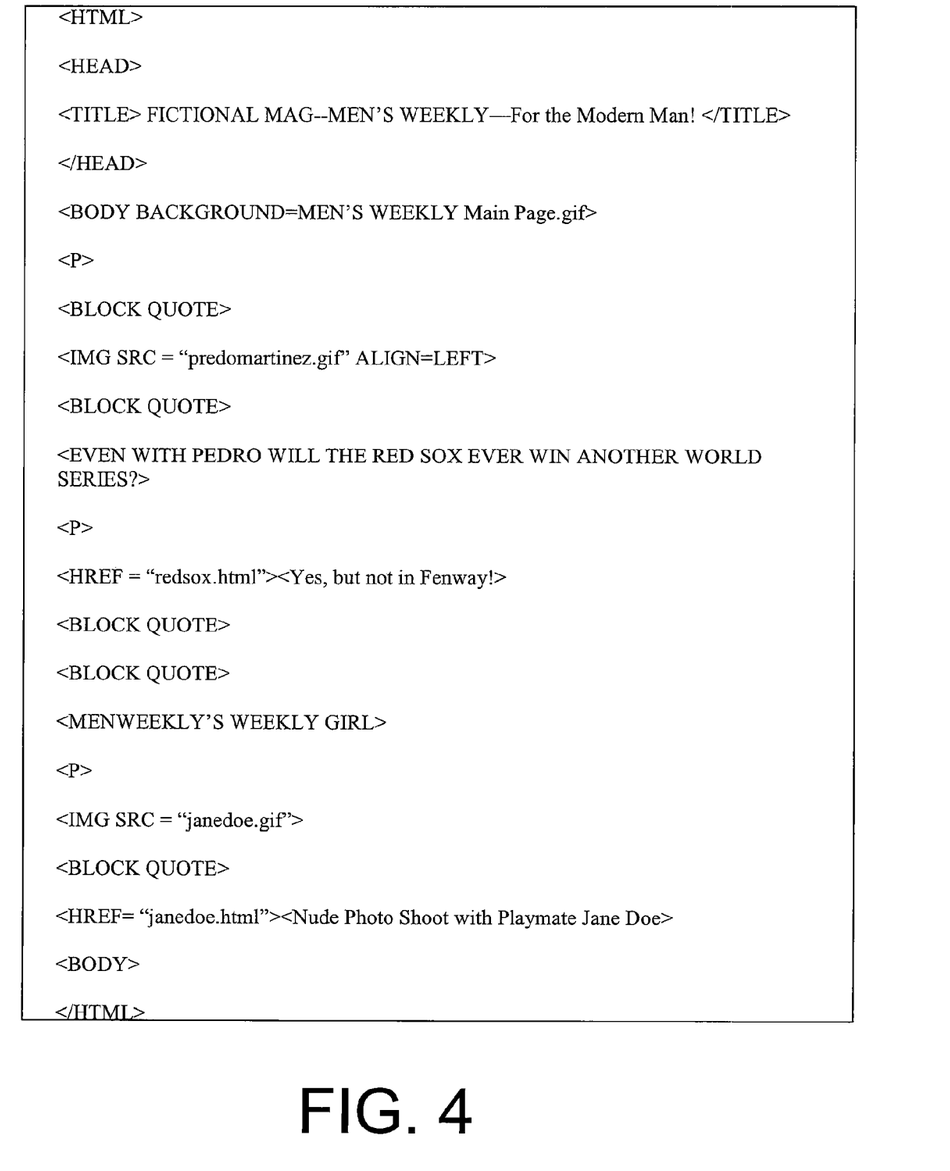
FIG. 4 is an example of dynamic information that may be screened by one implementation of the system of FIGS. 1A and 1B to approve or restrict access.

FIG. 4 shows an example of an HTML page 400 retrieved by the proxy server 132 in response to a request for network information for URL 206. The network information is provided to the RATS 134 or 137. The RATS 134 or 137 may extract the text from the page 400, and use the API 136 to access the dynamic resource classifier 139 to generate a content rating for each category in the content map 220 corresponding to the extracted text from the HTML page. For instance, based on the FIG. 4 example, the RATS 134 or 137 may generate a file containing the text "Men's Weekly: For The Modern Man; Pedro Martinez; Even with Pedro will the Redsox ever win another World Series; yes, but not in Fenway; Jane Doe; Nude photo shoot with Playmate Jane Doe." Based on this text, the RATS 134 or 137 may determine that the page 400 may contain content directed to pornography, due to the detection of predefined keywords, such as "nude" and "playmate." Similarly, extracted meta tags associated with the network information may used to determine a content rating.

Figure 5A:
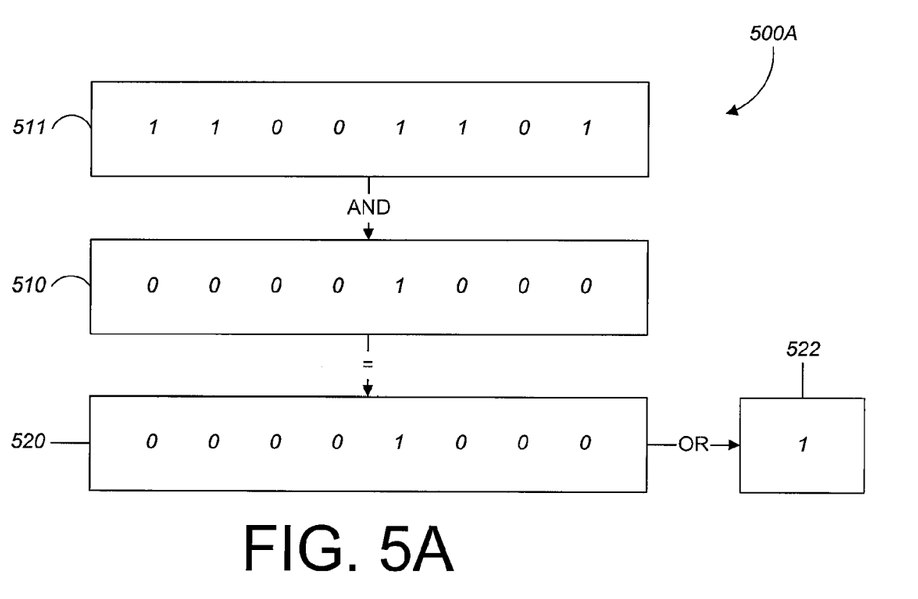
FIGS. 5A and 5B are examples of an application of user access information with the dynamic information of FIG. 4.
Figure 5B:
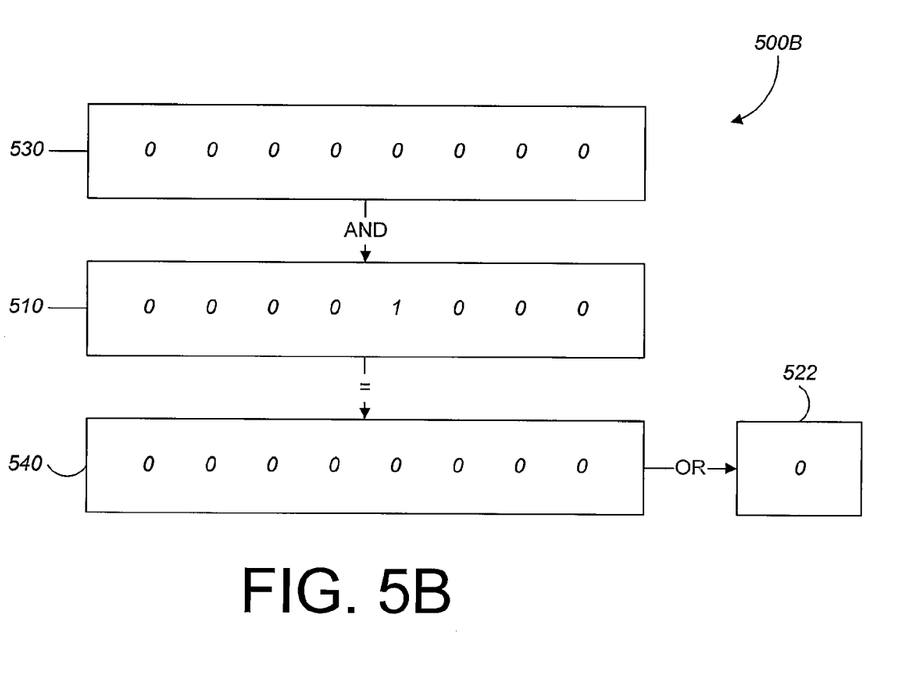

FIGS. 5A and 5B show examples 500A and 500B of a determination of whether or not to permit access based on the extracted data from page 400. For example, the RATS 134 or 137 may generate a content map 510 based on the extracted text of page 400. The content map 510 indicates that the page 400 may contain content in the category 225 pornography. If the RATS 134 compares the content map 510 to a user content setting 511 for a mature teen, the comparison generates the comparison set 520. A logic OR of the values in the comparison set 520 results in an indicator 322 having a value of logic one that indicates the page 400 should be blocked. However, when the content map 510 is compared to the user access information 530 for adults, the resulting comparison set 540 contains all zeros. Therefore, a logical OR of the values in comparison set 540 results in an indicator 522 having a logical zero that indicates that the page 400 may be accessed.

The Boolean logic used to illustrate the examples of FIGS. 2, 3, 5A and 5B are only examples of logic that may be used. Other equivalent techniques and methods may be used to implement the user access information and a content map.

The RATS 134 or 135 may be provided with a content override 140. The content override 140 may include a list, file, database, lookup table of URLs and associated classifications and content ratings. When the URL and user access information are provided, the RATS 134 or 135 may determine if the URL is included in the content override 140. If the URL is located in the content override, the RATS 134 or 135 determines the classification that is stored in the content override 140. If the content rating is classified as static, the RATS 134 or 135 accesses a content rating (e.g., a content map) associated with the URL in the content override 140 and compares the content rating with the user access information to determine if access should be granted. If the URL is classified as dynamic, the RATS 134 or 135 returns an indication to the proxy server 132 that the URL is dynamic. A determination may then be made for the dynamic URL as described above. In this manner, classification and content rating in the static classifier 138 may be overridden.

In another implementation, a content rating may be stored in the content override 140 that indicates access to network information should blocked or restrict to one or more user access information types, or all user access information types. A block may be useful in restricting access to network information that undesirable, such as, for example, network information that is prohibited by law or harmful to society as whole (e.g., a child pornography website), network information that is used to perpetrate crimes or break laws (e.g., furthering criminal activity, such as frauds or terrorist activity), or network information that poses a threat to or provided unwanted activity to users of the host (e.g., obtaining user passwords, perpetrating smurf attacks on systems, implementing Trojan horses, spamming users, or spreading viruses).

Figure 1:
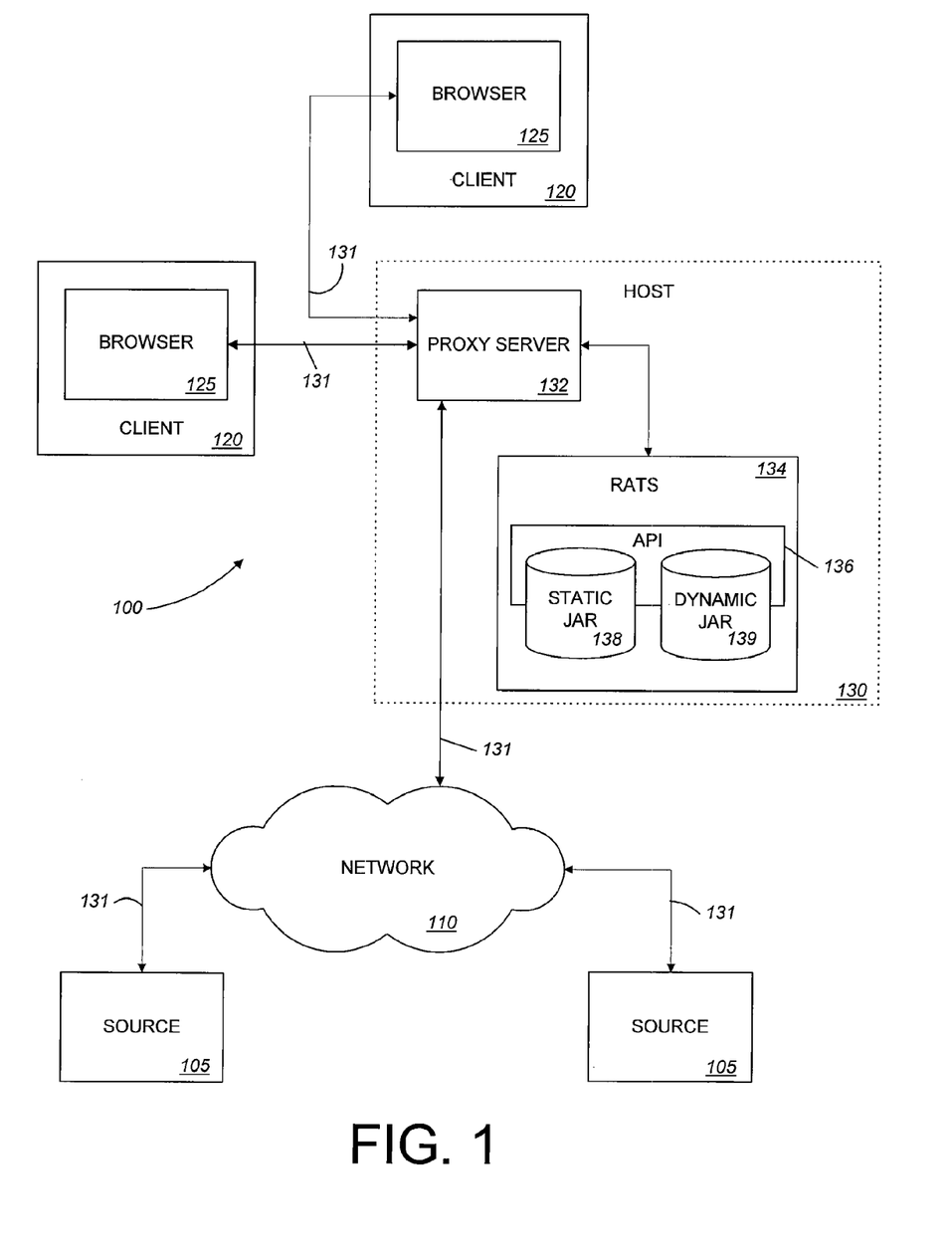
FIGS. 1A and 1B are exemplary systems that may be used to restrict access to information.
Figure 6:
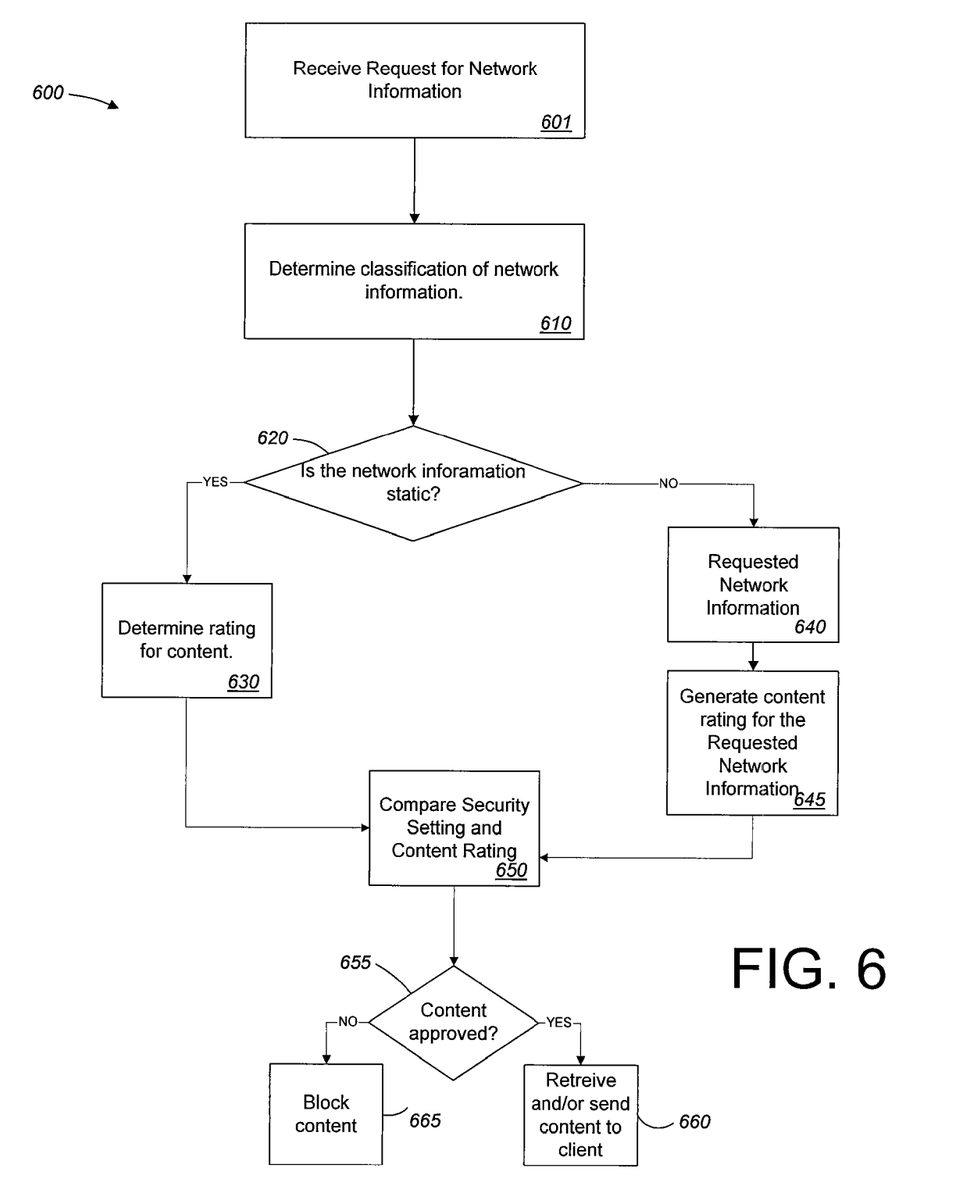
FIG. 6 is a flowchart of an exemplary procedure that may be used to restrict or approve access to information.

FIG. 6 shows an exemplary procedure 600 that may be used to restrict access to information using the system of FIG. 1. First, a request for network information is received (601). A determination is made whether there is an override of the URL (605). If there is an override, a classification of the override for the URL may be determined (606). If the classification is static, a content rating (e.g., a content map) may be determined from an override file (607).

If there is no override, a classification of the network information (e.g., static or dynamic) is determined (610). It then is determined whether the classification is static (620). If the network information is static, a rating of the content (e.g., a content map) that corresponds to the network information is determined (630). If the network information is dynamic, or if the override classification is dynamic, a request for the network information is made (640), and a rating of the content associated with the network information is generated (645).

After determining a content rating (645 or 650), the content rating is compared to a user access information of a user making the request (650). Based on the comparison, it is determined if access to network information is approved (655). If approved, the content is retrieved and/or access is granted (660); otherwise, the access to the network information is restricted or blocked (665).

In one implementation, a third party vendor may be used to provide one or more of the above described process elements (e.g., 630 or 645). For example, a third party vendor may provide information used to establish a content rating or content map for network information, or may generate content ratings for network information.

Figure 7:
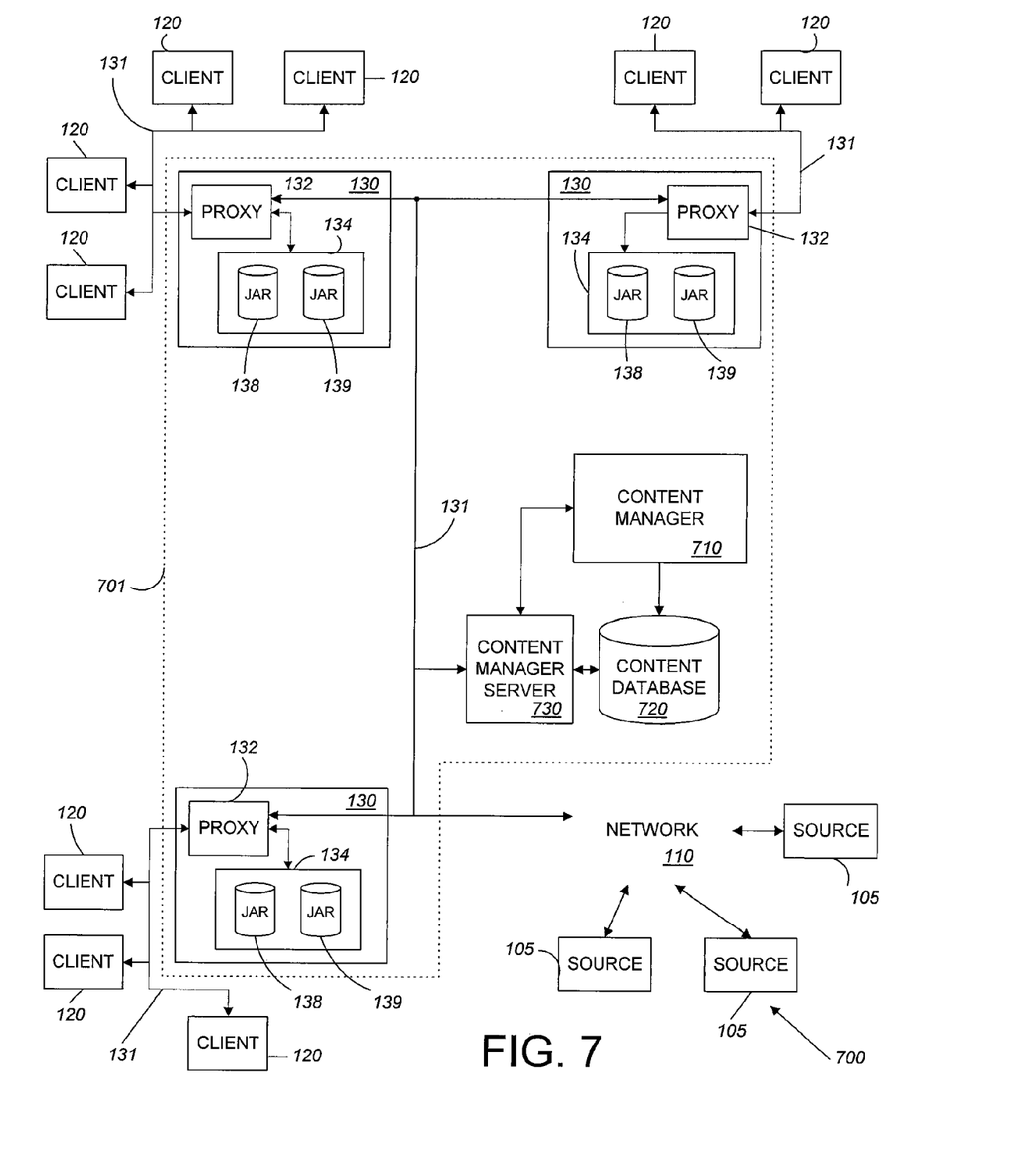
FIG. 7 is an exemplary block diagram of system that may be used to edit or override content ratings.

FIG. 7 shows a system 700 that includes a host system 701 with a number of hosts 130. Each of the hosts 130 may service requests for network information from a number of the same or different clients 120.

The host system 701 may include a content manager 710 application or tool that may be used with a browser application 711, a content manager database 720, and a content manager server 730. For example, the content manager 710 may be used by a system administrator to view current listings in the static classifiers 138, and/or to override the static classifiers 138.

The content manager 710 application or tool may be implemented using a processor, a computer, or an intelligent network device running a browser application. Although shown as an individual unit in FIG. 7, a content manager 710 may be implemented on one or more intelligent devices having a connection to a content manager server 730 and running the content manager software.

The content manager 710 may determine the classification (e.g., static or dynamic) and the content rating (e.g., a content map) associated with any address (e.g., a URL) that is stored in the static resource classifier 138 of a host 130. For example, the content manager 710 may send a request to the content manager server 730 to access the classification and/or content rating for a URL stored in a static resource classifier 138 or content override 140 of a host 130. The content manager server 730 may determine the content rating or classification by sending a request to a designated RATS 134 or 135. The RATS 134 or 135 responds with the requested classification and/or content rating. The classification and/or content rating may be stored in the content database 720 and/or displayed by the content manager 710 (e.g., as a web page).

The content manager 710 may override any classification or content rating stored by the static resource classifier 138 by storing a classification (e.g., static or dynamic) and/or content rating (e.g., a content map) in the content override 140. For example, the content manager 710 may change the classification associated with an address to static or dynamic. In addition, the content manager 710 may change or edit the content rating associated with an address. For example, the content manager 710 may change the value associated with a category in a content map. The content manager 710 also may provide a general override of the content rating by writing all ones to every category in a content map. In addition, as described above, a content rating may restrict or block access to network information for one or more specified user access information types, or block access to network information for all user access information types.

The content manager 710 may change the classification or content rating associated with an address stored in the content override 140 by identifying an address (e.g., a URL) and storing a classification and/or content rating (e.g., a content map or override) associated with the address in the content database 720. The content manager server 730 may access (e.g., periodically) the content database 720, and determine if any addresses are stored in the content database 720. For each address stored in the content database 720, the content manager server 730 may access the classification and/or content rating associated with the address and push the classification or content rating to each of the RATS 134 or 135. The RATS 134 or 135 access their content overrides 140 to store the new or updated classification and/or content rating associated with the address. In this manner, the classification or content rating in each static resource classifier 138 may be overridden at substantially the same time.

In another implementation, the RATSs 134 or 135 may request updates for their content overrides 140 by accessing the content management server 730 and database 720. The content management server 730 may send any content rating overrides to the requesting RATs 134 and 135 to be stored in their corresponding content overrides 140.

By classifying the network information (e.g., as static or dynamic), over-inclusive and under-inclusive effects of restrictions to network information may be limited or avoided. A static rating may be given to network information that includes content in one or more categories on a certain percentage of the time (e.g., 30%, 50%, 70%, 90%), which may be determined by the host operator. A dynamic rating allows network information that includes varying content to be screened and restricted, without using an over-inclusive determination to always block the information for certain user access information, or an under-inclusive determination that may let inappropriate or offensive information reach a user.

Processing times for determining restrictions also may be optimized. For example, by reserving the page-by-page determination of content to limited sites with dynamic content, processing efficiencies and speed may be increased without compromising security. In addition, the content manager allows a system operator to view content ratings to make sure the ratings are appropriate, and allows a system operator to override the content ratings if it is determined that inappropriate material is being accessed.

A number of exemplary implementations have been described. Nevertheless, it will be understood that various modifications may be made. For example, advantageous results may be achieved if the steps of the disclosed techniques are performed in a different order and/or if components in a disclosed architecture, device, or circuit are combined in a different manner and/or replaced or supplemented by other components. Accordingly, other implementations are within the scope of the following claims.

What is claimed is:

1. A method for determining whether to restrict access to network information, the method comprising:
   receiving, using one or more possessors, a request to access network information;
   after receiving the request, determining, with the one or more processors, whether the network information is classified as static or dynamic;
   if the determination indicates that the network information is classified as static:
   determining, with the one or more processors, a content rating for the static network information by using a first process,
   using the content rating for the static network information determined by the first process to determine, with the one or more processors, whether access to the static network information should be restricted, and
   if the determination indicates access to the static network information should be restricted, preventing, with the one or more processors, the requested network information from being accessed; and
   if the determination indicates that the network information is classified as dynamic:
   determining, with the one or more processors, a content rating for the dynamic network information by using a second process,
   using the content rating for the dynamic network information determined by the second process to determine, with the one or more processors, whether access to the dynamic network information should be restricted, and
   if the determination indicates access to the dynamic network information should be restricted, preventing, with the one or more processors, the requested network information from being accessed.

2. The method of claim 1 wherein static network information is network information that is consistently related to specific categories of content.

3. The method of claim 1 wherein dynamic network information is network information that is not consistently related to specific categories of content.

4. The method of claim 1 wherein determining the content rating for the static network information by using the first process includes accessing a predetermined content rating associated with the static network information.

5. The method of claim 4 wherein accessing the predetermined content rating includes accessing a content map that is configured to indicate whether content of the static network information includes content in one or more categories.

6. The method of claim 5 further comprising comparing the predetermined content rating to user access information.

7. The method of claim 6 wherein comparing the predetermined content rating to the user access information includes comparing the content map to the user access information, the user access information being configured to indicate content categories that are restricted.

8. The method of claim 1 wherein determining the content rating for the dynamic network information by using the second process includes accessing and analyzing content of the dynamic network information.

9. The method of claim 8 wherein accessing and analyzing content of the dynamic network information includes extracting content to be presented to a user from the dynamic network information and determining if the extracted content relates to content in one or more categories.

10. The method of claim 8 wherein accessing and analyzing content of the dynamic network information includes generating a content map that is configured to indicate whether content to be presented to a user includes content in one or more categories.

11. The method of claim 1 wherein determining whether the network information is classified as static or dynamic includes determining an address associated with the requested network information and determining a classification associated with the address.

12. The method of claim 1 further comprising determining user access information based on an address from which the request for the network information was initiated.

13. The method of claim 12 wherein the address is one of a uniform resource locator and an Internet protocol address.

14. The method of claim 13 wherein the user access information is configured to indicate whether content associated with one or more categories is restricted.

15. The method of claim 14 wherein using the content rating for the static network information determined by the first process to determine whether access to the static network information should be restricted includes determining whether any content that is restricted by the user access information is included in the dynamic network information.

16. The method of claim 14 wherein using the content rating for the dynamic network information determined by the second process to determine whether access to the dynamic network information should be restricted includes determining whether any content that is restricted by the user access information is included in the dynamic network information.

17. A system for determining whether to restrict access to network information including content to be presented to a user, the system comprising:
 a host configured to receive a request to access network information and to selectively prevent requested network information from being accessed;
 a rating device to determine whether network information of a received request to access network information is classified as static or dynamic, and to:
 if the determination indicates that the network information is classified as static:
 determine a content rating for the static network information by using a first process, use the content rating for the static network information determined by the first process to determine whether access to the static network information should be restricted, and
 if the determination indicates access to the static network information should be restricted, prevent the requested network information from being accessed; and
 if the determination indicates that the network information is classified as dynamic:
 determine a content rating for the dynamic network information by using a second process, use the content rating for the dynamic network information determined by the second process to determine whether access to the dynamic network information should be restricted, and
 if the determination indicates access to the dynamic network information should be restricted, prevent the requested network information from being accessed.

18. The system of claim 17 wherein static network information is network information that is consistently related to specific categories of content.

19. The system of claim 17 wherein dynamic network information is network information that is not consistently related to specific categories of content.

20. The system of claim 17 wherein, to determine the content rating for the static network information by using the first process, the rating device is configured to access a predetermined content rating associated with the static network information.

21. The system of claim 20 further comprising a content map configured to indicate whether content of static network information includes content in one or more categories, wherein, to access the predetermined content rating, the rating device is configured to access the content map.

22. The system of claim 21 wherein the rating device is configured to compare the predetermined content rating to user access information.

23. The system of claim 22 wherein, to compare the predetermined content rating to the user access information, the rating device is configured to compare the content map to the user access information, the user access information being configured to indicate content categories that are restricted.

24. The system of claim 17 wherein, to determine the content rating for the dynamic network information by using the second process, the rating device is configured to access and analyze content of the dynamic network information.

25. The system of claim 24 wherein, to access and analyze content of the dynamic network information, the rating device is configured to extract content to be presented to a user from the dynamic network information and determine if the extracted content relates to content in one or more categories.

26. The system of claim 24 wherein, to access and analyze content of the dynamic network information, the rating device is configured to generate a content map that is configured to indicate whether content to be presented to a user includes content in one or more categories.

27. The system of claim 17 wherein, to determine whether the network information is classified as static or dynamic, the rating device is configured to determine an address associated with the requested network information and to determine a classification associated with the address.

* * * * *